United States Patent
Fang et al.

(10) Patent No.: US 8,705,578 B2
(45) Date of Patent: Apr. 22, 2014

(54) METHOD AND SYSTEM FOR IMPLEMENTING TIME SYNCHRONIZATION IN LOCAL AREA NETWORK (LAN)

(75) Inventors: Yanbin Fang, Shenzhen (CN); Tao Liang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 82 days.

(21) Appl. No.: 13/497,693

(22) PCT Filed: Jun. 29, 2010

(86) PCT No.: PCT/CN2010/074663
§ 371 (c)(1),
(2), (4) Date: Mar. 22, 2012

(87) PCT Pub. No.: WO2010/149088
PCT Pub. Date: Dec. 29, 2010

(65) Prior Publication Data
US 2012/0294318 A1    Nov. 22, 2012

(30) Foreign Application Priority Data
Dec. 10, 2009    (CN) .......................... 2009 1 0252167

(51) Int. Cl.
*H04J 3/06* (2006.01)
(52) U.S. Cl.
USPC .......................................... 370/503; 370/509
(58) Field of Classification Search
USPC .................. 370/254, 255, 503, 509
See application file for complete search history.

(56) References Cited

U.S. PATENT DOCUMENTS

| | | | |
|---|---|---|---|
| 5,195,091 A * | 3/1993 | Farwell et al. | 370/336 |
| 6,324,586 B1 * | 11/2001 | Johnson | 709/248 |
| 7,483,448 B2 | 1/2009 | Bhandari et al. | |
| 8,032,073 B2 * | 10/2011 | Youssefzadeh et al. | 455/3.02 |
| 2004/0028162 A1 * | 2/2004 | Skahan et al. | 375/356 |

(Continued)

FOREIGN PATENT DOCUMENTS

| | | |
|---|---|---|
| CN | 1337138 A | 2/2002 |
| CN | 1874191 A | 12/2006 |
| JP | 2006010638 A | 1/2006 |

OTHER PUBLICATIONS

International Search Report for PCT/CN2010/074663 dated Sep. 26, 2010.

*Primary Examiner* — Hong Cho
(74) *Attorney, Agent, or Firm* — Ling Wu; Stephen Yang; Ling and Yang Intellectual Property

(57) ABSTRACT

A method and a system for implementing time synchronization in a local area network are disclosed, and the local area network includes a master system device (1) and a slave system device (31, 32, 33). The method includes: the master system device (1) synchronizing a local time according to a Universal Time Coordinated (UTC) time normally received from a Global Positioning System (GPS) satellite and a network clock aligned with the UTC time, and regularly broadcasting the local time to each network node which serves as the slave system device (31, 32, 33) and needs to perform time synchronization; and the slave system device (31, 32, 33) synchronously updating the local time according to the received local time of the maser system device (1) and a local network clock aligned with the network clock of the maser system device (1).

11 Claims, 4 Drawing Sheets

(56) References Cited

U.S. PATENT DOCUMENTS

| | | | |
|---|---|---|---|
| 2004/0228322 A1* | 11/2004 | Kim | 370/350 |
| 2008/0258965 A1* | 10/2008 | Azim | 342/357.1 |
| 2011/0051754 A1* | 3/2011 | Lansdowne | 370/503 |

* cited by examiner

METHOD AND SYSTEM FOR IMPLEMENTING TIME SYNCHRONIZATION IN LOCAL AREA NETWORK (LAN)

TECHNICAL FIELD

The present invention relates to the network time synchronization technology, and more especially, to a method and system for implementing time synchronization in a local area network.

BACKGROUND OF THE RELATED ART

In the field of network (including communication networks and multi-media broadcast networks), the concept of synchronization is frequency synchronization, that is, the clock frequency and phase of each node in the network conform to the provisions of the relevant standards. As a clock of a standalone system is based on a low-cost oscillating circuit or quartz clock, the error may be up to several seconds every day. However, with the increasing service types and enhancing dependence on the network in the communication field, an inaccurate system clock will have a strong influence on the security of a network structure and an application program thereof, especially of a network instruction or an application program which is comparatively sensitive to a time error problem caused by failure of implementation of network synchronization.

Time synchronization refers to the synchronization of the clock of each node in the network and the time and time interval of the clock of each application interface connected by the network with the Universal Time Coordinated (UTC). A time synchronization network is a basis for guaranteeing the time synchronization, and a time synchronization network can be constituted in a wired or wireless manner.

However, in the existing time synchronization network, either the system generation is extremely complicated, which causes a high cost of the system; or the time synchronization in the system is not precise enough, which causes a bad effect of time synchronization.

SUMMARY OF THE INVENTION

The technical problem to be solved by the present invention is to provide a method and system for implementing time synchronization in a local area network, which can fully utilize a network clock synchronization chip to implement accurate time synchronization.

In order to solve the above technical problem, the present invention provides a method for implementing time synchronization in a local area network, wherein the local area network comprises a master system device and a slave system device, and the method comprises:

the master system device synchronizing a local time according to a Universal Time Coordinated (UTC) time normally received from a Global Positioning System (GPS) satellite and a network clock aligned with the UTC time, and regularly broadcasting the local time to each network node which serves as the slave system device and needs to perform time synchronization; and the slave system device synchronously updating the local time according to the received local time of the maser system device and a local network clock aligned with the network clock of the maser system device.

Preferably, the step of the master system device synchronizing the local time according to the normally received UTC time from the GPS satellite and the network clock aligned with the UTC time comprises:

the master system device receiving a UTC time package of the GPS satellite through an UTC time receiving interruption, if the UTC time package is determined to be normally received, parsing the UTC time from the UTC time package; performing timing by a local network synchronization clock interruption aligned with a phase of the UTC time receiving interruption through the network clock, and adding a timed UTC time receiving cycle to the UTC time to be synchronized into the local time of the master system device.

Preferably, after the step of the master system device receiving the UTC time package of the GPS satellite through the UTC time receiving interruption, the method further comprises:

if the master system device determines that the UTC time package is abnormally received, the master system device maintaining the local time temporarily using a software delay mode; or synchronizing a UTC time simulated by using the software delay mode into the local time.

Preferably, the step of the master system device synchronizing the UTC time simulated by using the software delay mode into the local time comprises:

saving a number of seconds of a last timing triggered by the UTC time receiving interruption, and acquiring and saving a number of seconds of a current timing and a number of millisecond s of the current timing;

when it is not the first time to simulate the UTC time, and if a calculated difference between the number of seconds of the current timing and the number of seconds of the last timing is greater than the UTC time receiving cycle, subtracting one from the number of seconds of the current timing and saving as a number of seconds of the simulated UTC time; if the calculated difference between the number of seconds of the current timing and the number of seconds of the last timing is smaller than the UTC time receiving cycle, adding one to the number of seconds of the current timing and saving as the number of seconds of the simulated UTC time; and saving a number of milliseconds of the last timing as a number of current milliseconds of the simulated UTC time, and setting the saved simulated UTC time to be the local time.

Preferably, the step of the slave system device synchronously updating the local time according to the received local time of the maser system device and the local network clock aligned with the network clock of the maser system device comprises:

the slave system device storing the received local time broadcasted by the master system device regularly, and when the cycle of a next unit time in which the local network clock uses the local network synchronization clock interruption aligned with a phase of a network synchronization clock interruption of the master system device to perform timing arrives, adding the saved local time of the master system device with the unit time to be synchronized into the local time of the slave system device.

In order to solve the above technical problem, the present invention provides a system for implementing time synchronization in a local area network, which comprises a master system device and a slave system device, wherein:

the master system device is configured to synchronize a local time according to the normally received Universal Time Coordinated (UTC) time from a Global Positioning System (GPS) satellite and a network clock aligned with the UTC time, and regularly broadcast the local time to each network node that serves as the slave system device and needs to perform time synchronization; and the slave system device is configured to synchronously update the local time according to the received local time of the maser system device and a local network clock aligned with the network clock of the maser system device.

Preferably, the master system device comprises a first network clock synchronization module, an external time module, a first local time module and a time output module connected in sequence, wherein:

the first network clock synchronization module is configured to generate a network synchronization clock interruption aligned with a phase of a UTC time receiving interruption through an internal phase discriminator and crystal oscillator to perform a local network clock timing;

the external time module is configured to receive a UTC time package from the GPS satellite through the UTC time receiving interruption and parse out the UTC time if the UTC time package is determined to be normally received; and add a UTC time receiving cycle timed by the network clock to the UTC time parsed out to be output to the first local time module the local time;

the first local time module is configured to save the input local time;

the time output module is configured to broadcast and output the local time saved by the first local time module to the slave system device regularly.

Preferably, the slave system device comprises a time input module, a second local time module and a second network clock synchronization module connected in sequence, wherein:

the time input module is configured to output the received local time of the master system device to the second local time module;

the second local time module is configured to save the input local time of the master system device, and when a cycle interruption of a next unit time of the local network synchronization clock output by the second network clock synchronization module arrives, add the saved local time of the master system device to the unit time and output as the local time;

the second network clock synchronization module is configured to output a local network synchronization clock interruption which is the same with a phase of the network synchronization clock interruption of the master system device to the second local time module.

Preferably, the external time module is further configured to temporarily maintain the local time to be output to the local time module using a software delay mode if the UTC time package is determined to be received abnormally; or synchronize a UTC time simulated by using the software delay mode into the local time and output to the local time module.

Preferably, the external time module is configured to:

firstly save a number of seconds of a last timing and a number of milliseconds of the last timing triggered by the UTC time receiving interruption, acquire and save a number of seconds of a current timing and a number of milliseconds of the current timing; when it is not the first time to simulate the UTC time, and if a calculated difference between the number of seconds of the current timing and the number of seconds of the last timing is greater than the UTC time receiving cycle, subtract one from the number of seconds of the current timing and save as a number of seconds of the simulated UTC time; if the calculated difference between the number of seconds of the current timing and the number of seconds of the last timing is smaller than the UTC time receiving cycle, add one to the number of seconds of the current timing and save as the number of seconds of the simulated UTC time; and save a number of milliseconds of the last timing as a number of current milliseconds of the simulated UTC time, and set the saved simulated UTC time to be the local time.

Compared with the prior art, in the present invention, a time synchronization mechanism with a higher precision, which includes a network clock synchronization chip therein and is mostly based on the hardware is introduced, and it has a small burden on the network; besides, a multilevel software defensive processing is designed on this basis, thereby improving the accuracy and reliability of the time synchronization in the system, maintaining the high consistency of the time of each node in the network, and thus also enriching the application of the network clock synchronization chip.

PREFERRED EMBODIMENTS OF THE PRESENT INVENTION

Figure 1:
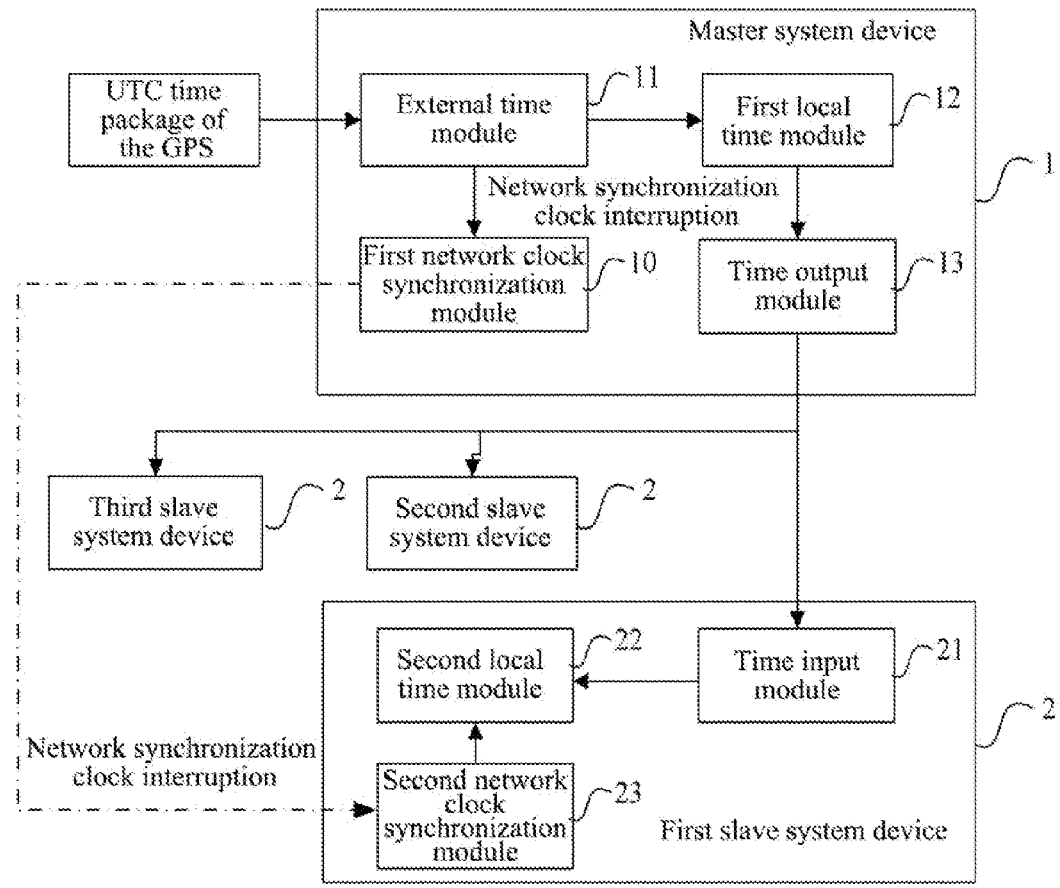
FIG. 1 is a schematic diagram of the structure of an example of the system for implementing time synchronization in a local area network according to the present invention.

In order to solve the problem of network clock synchronization, a protocol, Institute of Electrical and Electronics Engineers (IEEE) 1588, for precise clock synchronization related to the network exchange, local computation and assignment object has appeared, on which basis a plurality of network clock synchronization chips also appear.

The inventive concept of the method and system for implementing time synchronization in a local area network provided by the present invention is that: network time synchronization is implemented through the respective time synchronization mechanisms and mutually aligned network clocks of a master system and a slave system. Wherein, the master system synchronizes a UTC time standard received normally from a Global Positioning System (GPS) satellite into a local time, or uses a software delay mode to maintain the local time temporarily when the UTC time standard is received abnormally, or synchronizes a UTC time simulated by using the software delay mode into the local time when the UTC time standard is received abnormally for a long time; the slave system synchronously updates the local time according to the local time of the master system broadcasted regularly by the master system and a local network clock aligned with the network clock of the master system.

The technical scheme of the present invention will be elaborated in combination with the accompanying drawings and preferred examples below. The examples illustrated below are only used to describe and explain the present invention and not intended to limit the technical scheme of the present invention.

The example of the method for implementing time synchronization in a local area network provided by the present invention comprises:

configuring a master system device in the local area network, synchronizing a local time according to a UTC time standard normally received from a GPS satellite and a network clock aligned with the UTC time standard, and regularly broadcasting the local time of the master system to each network node that serves as a slave system device and needs to perform time synchronization; and the slave system device synchronously updating the local time according to the received local time of the maser system and the local network clock aligned with the network clock of the maser system.

After normally receiving a UTC time package from the GPS satellite through a UTC time receiving interruption, the master system device parses the UTC time from the time package, the network clock uses a network synchronization clock interruption aligned with the phase of the UTC time receiving interruption to perform timing, and a timed UTC time receiving cycle (2s) is added to the UTC time parsed out to be synchronized into the local time.

The master system device determines whether the UTC time package is normally received according to a symbol regulated by the protocol IEEE1588. When the master system device fails to receive the UTC time package normally, a software delay mode is used to maintain the local time temporarily. Or, when the master system device fails to receive the UTC time package normally for a long time, the UTC time simulated by using the software delay mode is synchronized into the local time.

The network clock of the slave system device uses a network synchronization clock interruption aligned with the phase of the network synchronization clock interruption of the master system device to perform timing.

As shown in FIG. 1, it is a structure of the example of the system for implementing time synchronization in a local area network provided by the present invention, comprising a master system device 1 and one or more slave system devices 2, wherein:

the master system device is configured to synchronize a local time according to a UTC time standard received normally from a GPS satellite and a network clock aligned with the UTC time standard, and regularly broadcast the local time of a master system to each network node that serves as the slave system device and needs to perform time synchronization; and the slave system device is configured to synchronously update the local time according to the received local time of the maser system and the local network clock aligned with the network clock of the maser system device.

The master system device and slave system device are connected with each other through their respective data communication interfaces to perform data communication mutually.

The master system device 1 shown in FIG. 1 further comprises a first network clock synchronization module 10, an external time module 11, a first local time module 12 and a time output module 13 connected in sequence, wherein:

the first network clock synchronization module is configured to perform a local network clock timing through a network synchronization clock interruption aligned with the phase of a UTC time receiving interruption;

the external time module is configured to receive a UTC time package from the GPS satellite through the UTC time receiving interruption and parse the UTC time from the time package after the UTC time package is determined to be normally received, take the time 2 s timed by the network synchronization clock interruption aligned with the phase of the UTC time receiving interruption as a UTC time receiving cycle, and add the UTC time receiving cycle to the UTC time parsed out to serve as the local time and output to the first local time module;

the first local time module is configured to save an input local time value; and the time output module is configured to broadcast and output the local time value saved by the first local time module to the slave system device regularly.

Figure 3:
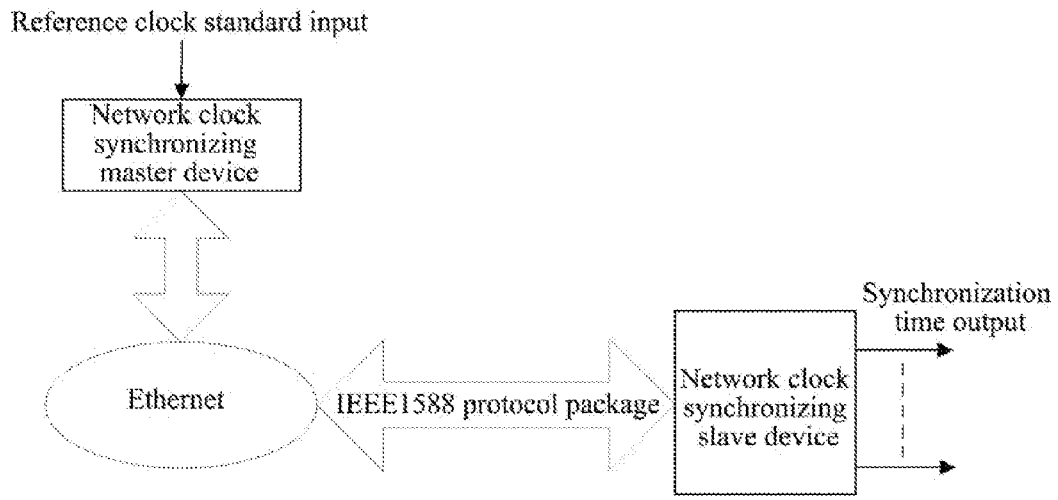
FIG. 3 is a schematic diagram of applying a network clock synchronization chip to the example of the system illustrated in FIG. 1 to perform a network clock synchronization initialization scenario.

The above first network clock synchronization module is implemented specifically by way of combining a dedicated network clock synchronization chip with a software. The software consists of two parts, wherein, the first part is a software package in a processor running on the synchronization chip and is mainly used to configure and drive the synchronization chip and upgrade the firmware; and the second part is the firmware running on the synchronization chip. The two parts of the software communicate with each other via a Serial Peripheral Interface (SPI) to implement control on the network clock synchronization of the synchronization chip. A program on the synchronization chip perform a IEEE1588 protocol communication between the network clocks of the master system and slave system via a network interface self-contained in the chip, thereby implementing initialization of the network clock synchronization of the master system and slave system, as shown in FIG. 3.

Figure 2:
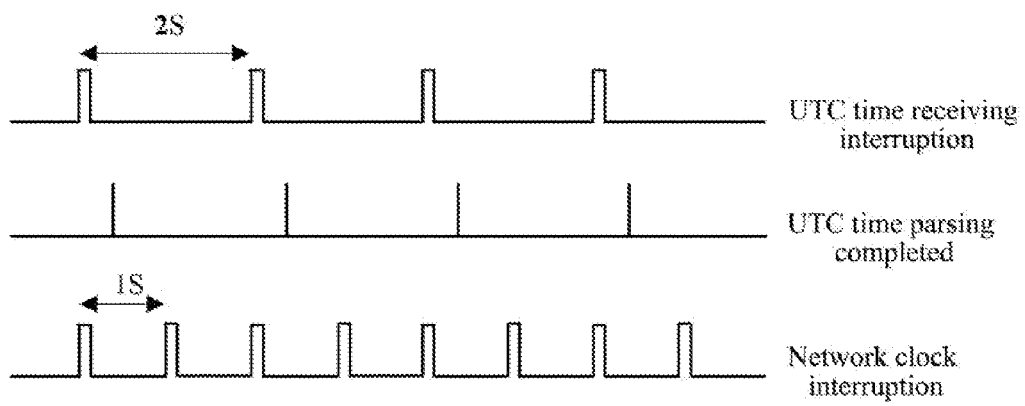
FIG. 2 is a schematic diagram of the relationship for matching the network synchronization interruption with the UTC time signal receiving interruption of the Global Positioning System (GPS) according to the present invention.

As a certain time difference exists between the external time module receiving the UTC time package and parsing the UTC time from the UTC time package, as shown in FIG. 2, a second interruption generated by the network synchronization clock aligned with the phase of the UTC time receiving interruption is used to time for 2 seconds to precisely adjust the above time difference.

The external time module generates the network synchronization clock interruption aligned with the phase of the UTC time receiving interruption through an internal phase discriminator and accurate crystal oscillator, outputs the network synchronization clock interruption to the network clock synchronization module, and then output to the slave system device through the network clock synchronization module.

The external time module judges and determines whether the UTC time package is normally received according to a symbol regulated by the protocol IEEE1588. When the external time module fails to receive the UTC time package normally, a software delay mode is used to temporarily maintain the local time value is output. Or, when the external time module fails to receive the UTC time package normally for a long time, the UTC time simulated through the software delay mode is synchronized into the local time value to be output.

The slave system device (such as the first slave system device shown in FIG. 1) 2 illustrated in FIG. 1 further comprises a time input module 21, a second local time module 22 and a second network clock synchronization module 23 connected in sequence, wherein:

the time input module is configured to output the received local time of the master system regularly broadcasted by the master system device to the second local time module;

the second local time module is configured to save the input local time of the master system device, and add the time 1 s to the saved local time of the master system device and output as the local time when the network synchronization clock interruption output by the second network clock synchronization module arrives;

the second network clock synchronization module is configured to output the network synchronization clock interruption input from the master system device to the second local time module.

As shown in FIG. 3, a reference clock is input at a network clock synchronization master device (i.e. the network clock synchronization module of the master system and the first network clock synchronization module) terminal, and an IEEE1588 precision time protocol reference package is generated and output to a network clock synchronization slave device (i.e. the network clock synchronization module of the slave system and the second network clock synchronization module) terminal, and then a stable clock output is generated by the network clock synchronization slave device.

Figure 4:
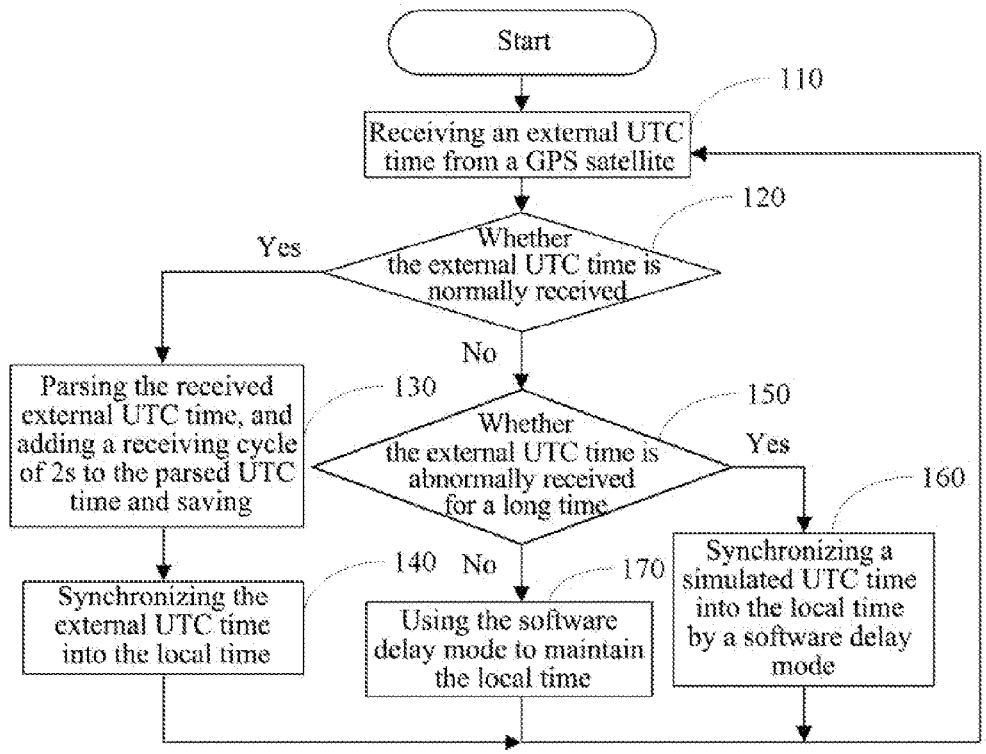
FIG. 4 is a flow chart of the method for the master system in the example of the system illustrated in FIG. 1 performing time synchronization.

As shown in FIG. 4, it is a flow of the method for the master system device in the example of the system illustrated in FIG. 1 performing time synchronization, which comprises the following steps.

In step 110, an external UTC time from a GPS satellite is received;

a master system device receives a UTC time package from the GPS satellite through a UTC time receiving interruption.

In step 120, whether the external UTC time is normally received is judged, and if yes, step 130 is executed, otherwise step 150 is executed;

the master system device judges whether the UTC time package is normally received according to a symbol regulated by an IEEE1588 protocol.

In step 130, the received external UTC time is parsed, and the parsed UTC time is added by a receiving cycle of 2 s and saved as the external UTC time.

In step 140, the external UTC time is synchronized into a local time, return to carry out step 110.

In step 150, whether the external UTC time is abnormally received for a long time is continually judged, and if yes, step 160 is executed, otherwise step 170 is executed;

In step 160, a software delay mode is used to synchronize the simulated UTC time into the local time, return to carry out step 110.

In step 170, the software delay mode is used to maintain the local time, return to carry out step 110.

It can be seen from FIG. 4 that the time synchronization of the present invention is maintained through a time with a three-layer structure, wherein the time precision from high to low is an actual UTC time generated by GPS, a simulated UTC time and a time maintained on the basis of system software delay in sequence. In practical applications, the actual UTC time generated by GPS is preferably selected, and only when the GPS has an abnormal reception, the system software delay is used to transit to the simulated UTC time. The actual UTC time is used again after the reception of GPS returns to normal.

Figure 5:
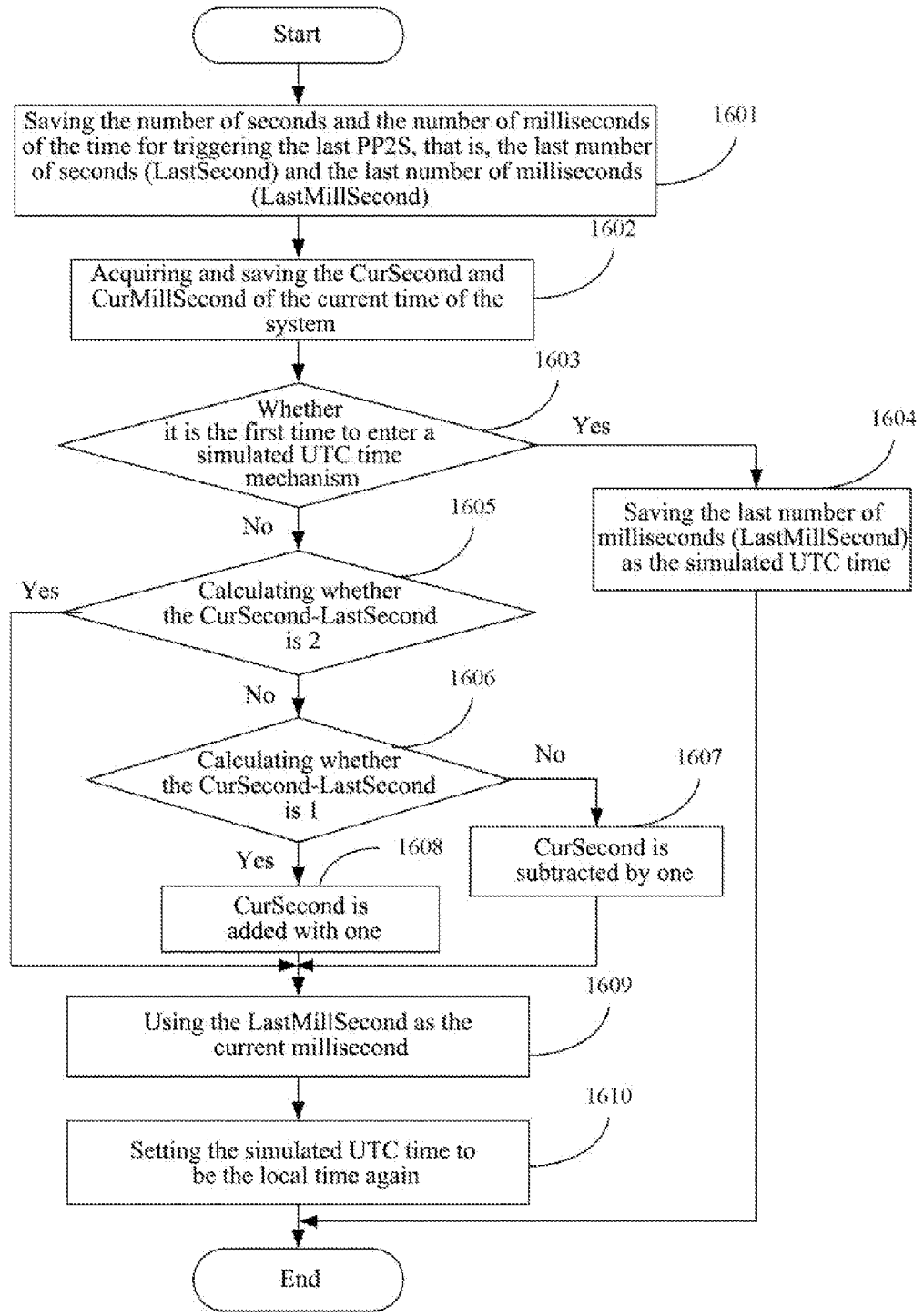
FIG. 5 is a flow chart of the method for the master system in the example of the system illustrated in FIG. 1 synchronizing the simulated UTC time into the local time.

FIG. 5 illustrates the specific flow of using the software delay mode to synchronize the simulated UTC time into the local time in the step 160 in FIG. 4, which comprises the following steps.

In step 1601, the number of seconds and the number of milliseconds of the time for triggering the last PP2S (i.e. a UTC time receiving interruption) are saved, the last number of seconds is LastSecond, and the last number of milliseconds is LastMillSecond.

In step 1602, the number of seconds CurSecond and the number of milliseconds CurMillSecond of the current time of the system are acquired and saved.

In step 1603, whether it is the first time to enter an simulated UTC time mechanism is judged, if yes, step 1604 is executed, otherwise step 1605 is executed.

In step 1604, the last number of milliseconds LastMillSecond is saved as the simulated UTC time, and the flow ends.

In step 1605, whether the CurSecond-LastSecond is 2 is calculated, if yes, step 1609 is executed, otherwise step 1606 is executed.

In step 1606, whether the CurSecond-LastSecond is 1 is calculated, if yes, step 1608 is executed, otherwise step 1607 is executed.

In step 1607, if the above difference is calculated to be 3, it indicates that the simulated time is faster, the CurSecond−1 is saved as the number of seconds of the simulated UTC time, and step 1609 is executed.

In step 1608, if the above difference is calculated to be 1, it indicates that the simulated time is slower, the CurSecond+1 is saved as the number of seconds of the simulated UTC time.

In step 1609, LastMillSecond is used as the current number of milliseconds of the simulated UTC time.

In step 1610, the simulated UTC time is reset to be the local time, and the flow ends.

Figure 6:
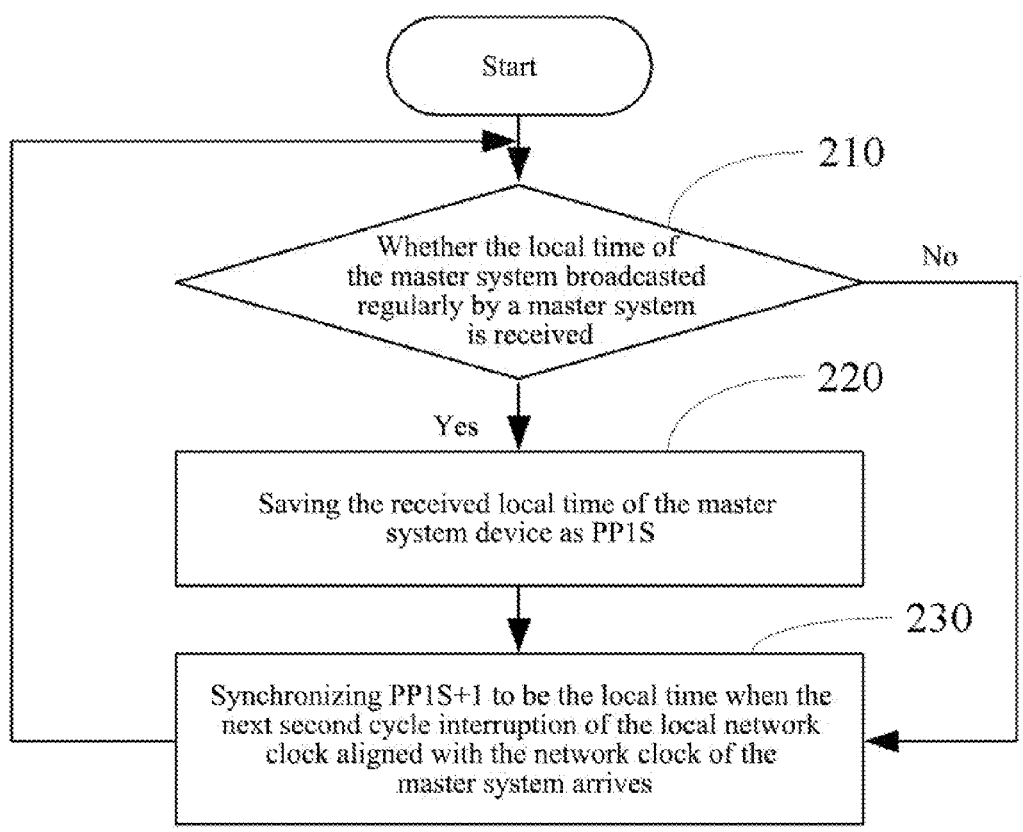
FIG. 6 is a flow chart of the method for the slave system in the example of the system illustrated in FIG. 1 performing time synchronization.

FIG. 6 illustrates the specific flow of the method for the slave system device in the example of the system shown in FIG. 1 performing time synchronization, which comprises the following steps.

In step 210, whether the local time of the master system regularly broadcasted by the master system device is received is judged, if yes, step 220 is executed, otherwise step 230 is executed.

In step 220, the received local time of the master system device is saved as PP1S.

In step 230, when the next second cycle interruption of the local network clock aligned with the network clock of the master system device arrives, the PP1S+1 is synchronized into the local time; return to carry out step 210.

The local network clock of the slave system device performs timing using the network synchronization clock interruption of the slave system device aligned with the phase of the network synchronization clock interruption of the master system device, and the PP1S+1 is configured to be the local time when the next second cycle arrives.

It should be noted that the UTC time standard in the above examples is precisely the UTC time; the UTC time receiving cycle 2s and network clock interruption cycle 1s mentioned in the above examples are only an illustrated example, and the UTC time receiving cycle and network clock interruption cycle can be configured as needed.

As can be seen from the above examples, in the present invention, the network time synchronization and network clock synchronization are used in coordination, which achieves a network clock interruption with a cycle of 1 s based on a high-performance network clock synchronization chip (module) on the master system device and slave system device respectively. With an alignment mechanism between the phase of UTC time receiving interruption of the GPS and the phase of the network synchronization clock interruption and a defensive design for preventing a time configuration error caused by abnormal working of a GPS antenna, the reliability and accuracy of the time synchronization of the network system are both improved, on the basis of which the time of each node in the network can be maintained in a higher consistency, and thus the application of the network clock synchronization chip is also enriched.

The ordinary skilled in the art can understand that all or parts of the steps in the above method can be completed by a program instructing the relevant hardware, and the program can be stored in a computer readable storage medium, such as a read-only memory, disc disk and optical disk and so on. Optionally, all or parts of steps in the above examples can also be implemented by using one or more integrated circuits. Correspondingly, each module/unit in the above examples can be implemented in a form of hardware, or in a form of software function module. The present invention is not limited to any specific form of the combination of hardware and software. The above description is only the preferred examples of the present invention and not used to limit the containment scope of the present invention. All the modifications, equivalent replacements and improvements and so on made within the spirit and principle of the present invention shall fall into the protection scope of the present invention.

INDUSTRIAL APPLICABILITY

In the method and system for implementing time synchronization in the local area network provided by the present invention, the network time synchronization and network clock synchronization are used in coordination, which achieves the network clock interruption through a high performance network clock synchronization chip on the master system device and slave system device respectively. With an alignment mechanism between the phase of UTC time receiving interruption of the GPS and the phase of the network synchronization clock interruption and a defensive design for preventing a time configuration error caused by abnormal working of a GPS antenna, the reliability and accuracy of the time synchronization of the network system are improved, on the basis of which, meanwhile, the time of each node in the network can be maintained in a higher consistency, and thus the application of the network clock synchronization chip is also enriched.

What is claimed is:

1. A method for implementing time synchronization in a local area network, wherein the local area network comprises a master system device and a slave system device, and the method comprises:

the master system device synchronizing a local time according to a Universal Time Coordinated (UTC) time normally received from a Global Positioning System (GPS) satellite and a network clock aligned with the UTC time, and regularly broadcasting the local time to each network node which serves as the slave system device and needs to perform time synchronization; and the slave system device synchronously updating the local time according to the local time of the maser system device which is received and a local network clock aligned with the network clock of the maser system device;

wherein the step of the master system device synchronizing the local time according to the UTC time normally received from the GPS satellite and the network clock aligned with the UTC time comprises:

the master system device receiving a UTC time package of the GPS satellite through an UTC time receiving interruption, if the UTC time package is determined to be normally received, parsing the UTC time from the UTC time package; performing timing by a local network synchronization clock interruption aligned with a phase of the UTC time receiving interruption through the network clock, and adding a timed UTC time receiving cycle to the UTC time to be synchronized into the local time of the master system device.

2. The method according to claim 1, wherein, after the step of the master system device receiving the UTC time package of the GPS satellite through the UTC time receiving interruption, the method further comprises:

if the master system device determines that the UTC time package is abnormally received, the master system device maintaining the local time temporarily by using a software delay mode; or synchronizing a UTC time simulated by using the software delay mode into the local time.

3. The method according to claim 2, wherein, the step of the master system device synchronizing the UTC time simulated by using the software delay mode into the local time comprises:

saving a number of seconds of a last timing triggered by the UTC time receiving interruption, and acquiring and saving a number of seconds of a current timing and a number of milliseconds of the current timing;

when it is not the first time to simulate the UTC time, and if a calculated difference between the number of seconds of the current timing and the number of seconds of the last timing is greater than the UTC time receiving cycle, subtracting one from the number of seconds of the current timing and saving as a number of seconds of the simulated UTC time; if the calculated difference between the number of seconds of the current timing and the number of seconds of the last timing is smaller than the UTC time receiving cycle, adding one to the number of seconds of the current timing and saving as the number of seconds of the simulated UTC time; and saving a number of milliseconds of the last timing as a number of current milliseconds of the simulated UTC time, and setting the saved simulated UTC time to be the local time.

4. The method according to claim 3, wherein, the step of the slave system device synchronously updating the local time according to the received local time of the maser system device and the local network clock aligned with the network clock of the maser system device comprises:

the slave system device storing the received local time broadcasted by the master system device regularly, and when a cycle of a next unit time in which the local network clock uses the local network synchronization clock interruption aligned with a phase of a network synchronization clock interruption of the master system device to perform timing arrives, adding the saved local time of the master system device with the unit time to be synchronized into the local time of the slave system device.

5. The method according to claim 2, wherein, the step of the slave system device synchronously updating the local time according to the received local time of the maser system device and the local network clock aligned with the network clock of the maser system device comprises:

the slave system device storing the received local time broadcasted by the master system device regularly, and when a cycle of a next unit time in which the local network clock uses the local network synchronization clock interruption aligned with a phase of a network synchronization clock interruption of the master system device to perform timing arrives, adding the saved local time of the master system device with the unit time to be synchronized into the local time of the slave system device.

6. The method according to claim 1, wherein, the step of the slave system device synchronously updating the local time according to the received local time of the maser system device and the local network clock aligned with the network clock of the maser system device comprises:

the slave system device storing the received local time broadcasted by the master system device regularly, and when a cycle of a next unit time in which the local network synchronization clock uses the local network synchronization clock interruption aligned with a phase of a network synchronization clock interruption of the master system device to perform timing arrives, adding the saved local time of the master system device with the unit time to be synchronized into the local time of the slave system device.

7. A system for implementing time synchronization in a local area network, comprising a master system device and a slave system device, wherein:
the master system device is configured to synchronize a local time according to a Universal Time Coordinated (UTC) time normally received from a Global Positioning System (GPS) satellite and a network clock aligned with the UTC time, and regularly broadcast the local time to each network node that serves as the slave system device and needs to perform time synchronization;
the slave system device is configured to synchronously update the local time according to the received local time of the maser system device and a local network clock aligned with the network clock of the maser system device;
wherein the master system device is configured to synchronize the local time according to the UTC time normally received from the GPS satellite and the network clock aligned with the UTC time by:
the master system device receiving a UTC time package of the GPS satellite through an UTC time receiving interruption, if the UTC time package is determined to be normally received, parsing the UTC time from the UTC time package; performing timing by a local network synchronization clock interruption aligned with a phase of the UTC time receiving interruption through the network clock, and adding a timed UTC time receiving cycle to the UTC time to be synchronized into the local time of the master system device.

8. The system according to claim 7, wherein, the master system device comprises a first network clock synchronization module, an external time module, a first local time module and a time output module connected in sequence, wherein:
the first network clock synchronization module is configured to generate a network synchronization clock interruption aligned with a phase of a UTC time receiving interruption through an internal phase discriminator and crystal oscillator to perform a local network clock timing;
the external time module is configured to receive a UTC time package from the GPS satellite through the UTC time receiving interruption and parse out the UTC time if the UTC time package is determined to be normally received; and add a UTC time receiving cycle timed by the network clock to the UTC time parsed out to be as the local time to output to the first local time module;
the first local time module is configured to save the input local time;
the time output module is configured to broadcast and output the local time saved by the first local time module to the slave system device regularly.

9. The system according to claim 8, wherein, the slave system device comprises a time input module, a second local time module and a second network clock synchronization module connected in sequence, wherein:
the time input module is configured to output the received local time of the master system device to the second local time module;
the second local time module is configured to save the input local time of the master system device, and when a cycle interruption of a next unit time of the local network synchronization clock output by the second network clock synchronization module arrives, add the saved local time of the master system device to the unit time and output as the local time;
the second network clock synchronization module is configured to output a local network synchronization clock interruption which is the same with a phase of the network synchronization clock interruption of the master system device to the second local time module.

10. The system according to claim 9, wherein, the external time module is configured to:
firstly save a number of seconds of a last timing and a number of milliseconds of the last timing triggered by the UTC time receiving interruption, acquire and save a number of seconds of a current timing and a number of milliseconds of the current timing; when it is not the first time to simulate the UTC time, and if a calculated difference between the number of seconds of the current timing and the number of seconds of the last timing is greater than the UTC time receiving cycle, subtract one from the number of seconds of the current timing and save as a number of seconds of the simulated UTC time; if the calculated difference between the number of seconds of the current timing and the number of seconds of the last timing is smaller than the UTC time receiving cycle, add one to the number of seconds of the current timing and save as the number of seconds of the simulated UTC time; and save a number of milliseconds of the last timing as a number of current milliseconds of the simulated UTC time, and set the saved simulated UTC time to be the local time.

11. The system according to claim 8, wherein,
the external time module is further configured to temporarily maintain the local time to be output to the local time module by using a software delay mode if the UTC time package is determined to be received abnormally; or synchronize a UTC time simulated by using the software delay mode into the local time and output to the local time module.

* * * * *